United States Patent

[11] 3,596,010

[72] Inventor Harry C. Patterson
Apt. 1506, Presbyterian Apts., Virginia Ave., Fort Myers, Fla. 33901

[21] Appl. No. 656,803
[22] Filed July 28, 1967
[45] Patented July 27, 1971

[54] TRAVEL-DIRECTING DEVICE
6 Claims, 10 Drawing Figs.

[52] U.S. Cl. ........ 179/100.2 S, 179/100.1 C
[51] Int. Cl. ........ G11b 15/02, G11b 31/00, G11b 15/18
[50] Field of Search ........ 179/100.1 PS, 100.1 B, 100.2 S; 200/155, 61.14, 164; 35/35.3; 340/259

[56] References Cited
UNITED STATES PATENTS

| | | | |
|---|---|---|---|
| 3,419,687 | 12/1968 | Stewart | 179/100.2 |
| 3,427,408 | 2/1969 | Lempert et al. | 179/100.2 |
| 2,965,720 | 12/1960 | Bumstead | 179/100.1 |
| 2,662,954 | 12/1953 | Snow | 200/155 |
| 3,181,421 | 5/1965 | Nimke | 179/100.2 |

*Primary Examiner*—Bernard Konick
*Assistant Examiner*—Robert S. Tupper
*Attorneys*—Clarence A. O'Brien and Harvey B. Jacobson

ABSTRACT: An automotive vehicle equipped with a tape playback device modified so that continuous movement of the tape is stopped after each message portion recorded thereon. Travel-directing information instructs the vehicle driver to position a selector switch assembly for controlling operation of the tape playback device to resume message playback either on demand, by actuating a pushbutton request switch, or by signals produced at predetermined distances travelled.

Harry C. Patterson
INVENTOR.

BY Clarence A. O'Brien and Harvey B. Jacobson
Attorneys

Harry C. Patterson
INVENTOR
BY Clarence A. O'Brien
and Harvey B. Jacobson
Attorneys

TRAVEL-DIRECTING DEVICE

This invention relates to an audible type of travel directing system adapted to be mounted within an automotive vehicle.

Audio-message-reproducing devices have been used for instructional as well as tourist-guiding purposes. The use of tape recorder playback devices installed in automotive vehicles have also been suggested for travel-directing purposes. There are however, special requirements associated with any travel-directing system that must be met in order to render the audio playback device suitable. An important object of the present invention therefore is to utilize such an audio playback device for travel-directing purposes without excessive complexity in equipment, installation and operational procedure.

In accordance with the present invention, a travel-directing system is provided which combines an audio reproducing system including a tape transport mechanism, with a selector control assembly and the vehicle odometer. By means of the selector control assembly, the vehicle operator may select an operational mode in accordance with instructions received from the tape playback system in order to resume operation thereof after the tape transport mechanism has automatically stopped either on request or after the vehicle has travelled a predetermined distance as indicated on the odometer. The tape playback mechanism is accordingly modified pursuant to the requirements of the present invention so as to automatically stop upon completion of discrete message portions reproduced from the tape. In this regard, it will be appreciated that the travel-directing system may be readily associated with the removable tape transport mechanisms presently available for playback of audio signals on tape through the speaker of the audio reproducing system.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
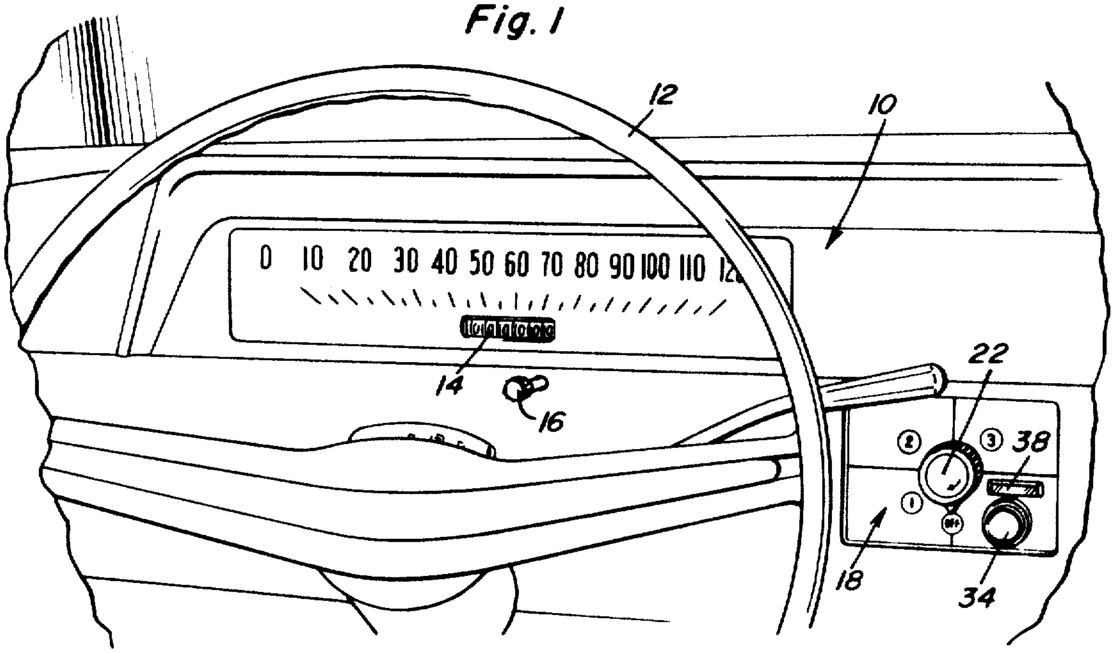
FIG. 1 is a partial perspective view of the control panel within an automotive vehicle showing a typical installation for the travel-directing system of the present invention.

Referring now to the drawings in detail, FIG. 1 shows a typical installation for the travel-directing system within an automotive vehicle. The vehicle is provided with the usual control dash panel generally referred to by reference numeral 10 located forwardly of the vehicle steering wheel 12, the control dash panel mounting among other things, the mileage-indicating window 14 through which the wheels associated with the vehicle odometer are visible. Projecting from the panel 10 adjacent to the odometer, is a setting knob 16 to be utilized in one form of the invention as will e hereafter explained. Also mounted on the panel 10 at a suitable location within reach of the vehicle operator, is a selector control panel assembly generally referred to be reference numeral 18.

Figure 2:
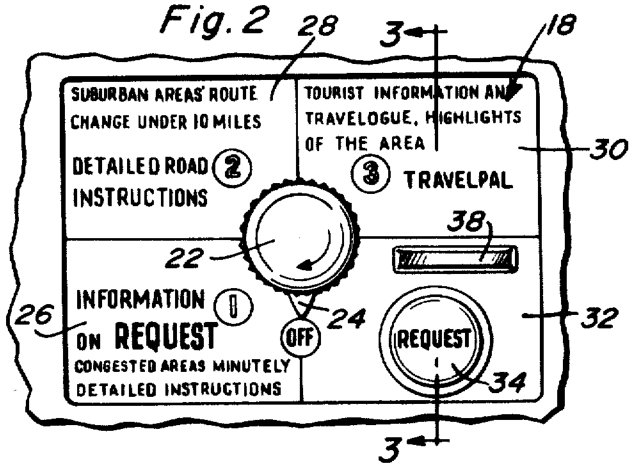
FIG. 2 is an enlarged front elevational view of the selector control assembly associated with the travel-directing system.
Figure 3:
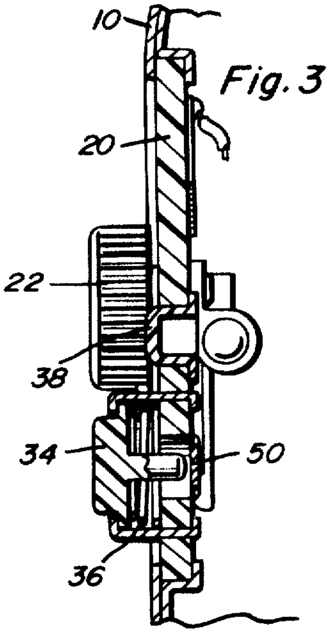
FIG. 3 is a transverse sectional view taken substantially through a plane indicated by section line 3–3 in FIG. 2.
Figure 4:
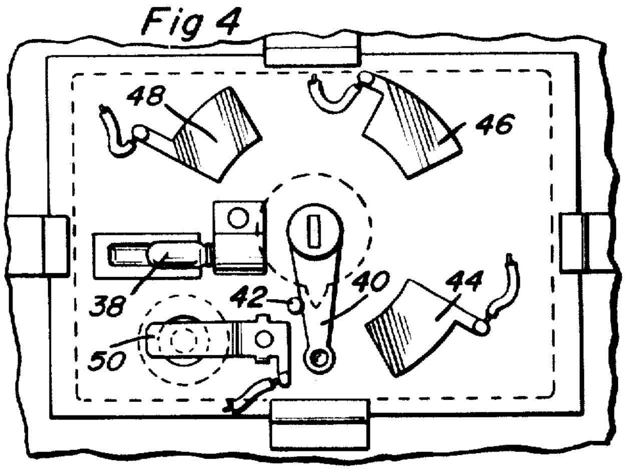
FIG. 4 is a rear elevational view of the selector control assembly.

Referring now to FIGS. 2, 3 and 4, it will be observed that the control panel assembly 18 includes a panelboard 20 fixedly mounted within an opening formed in the control panel 10 of the vehicle. The panelboard 20 is made of a nonconductive material and rotatably mounts a selector knob 22 having a pointer portion 24 adapted to be angularly displaced from an off position as illustrated in FIG. 2 to operative positions on three labeled quadrants 26, 28 and 30 of the panelboard. The fourth quadrant 32 on the front face of the panelboard mounts a pushbutton request switch 34 which is normally held in an open position by means of a spring 36. Also mounted within the quadrant 32, is a pilot lamp 38. As more clearly seen in FIG. 4, the selector knob 22 is connected to a switch arm 40 adapted to be angularly displaced from the off position engaging the stop 42 in a counterclockwise direction as viewed in FIG. 4 in order to engage the conductive contact plates 44, 46 and 48 respectively associated with the labeled quadrants 26, 28 and 30 of the panelboard. A switch element 50 is also mounted on the quadrant 32 associated with the pushbutton request switch 34. Electrical conductors are accordingly connected to each of the conductive plates 44, 46, 48 and switch element 50 as well as to the switch arm 40 and the pilot lamp 38 to form a control circuit as will be hereafter explained.

Figures 7, 8, 9, 10:
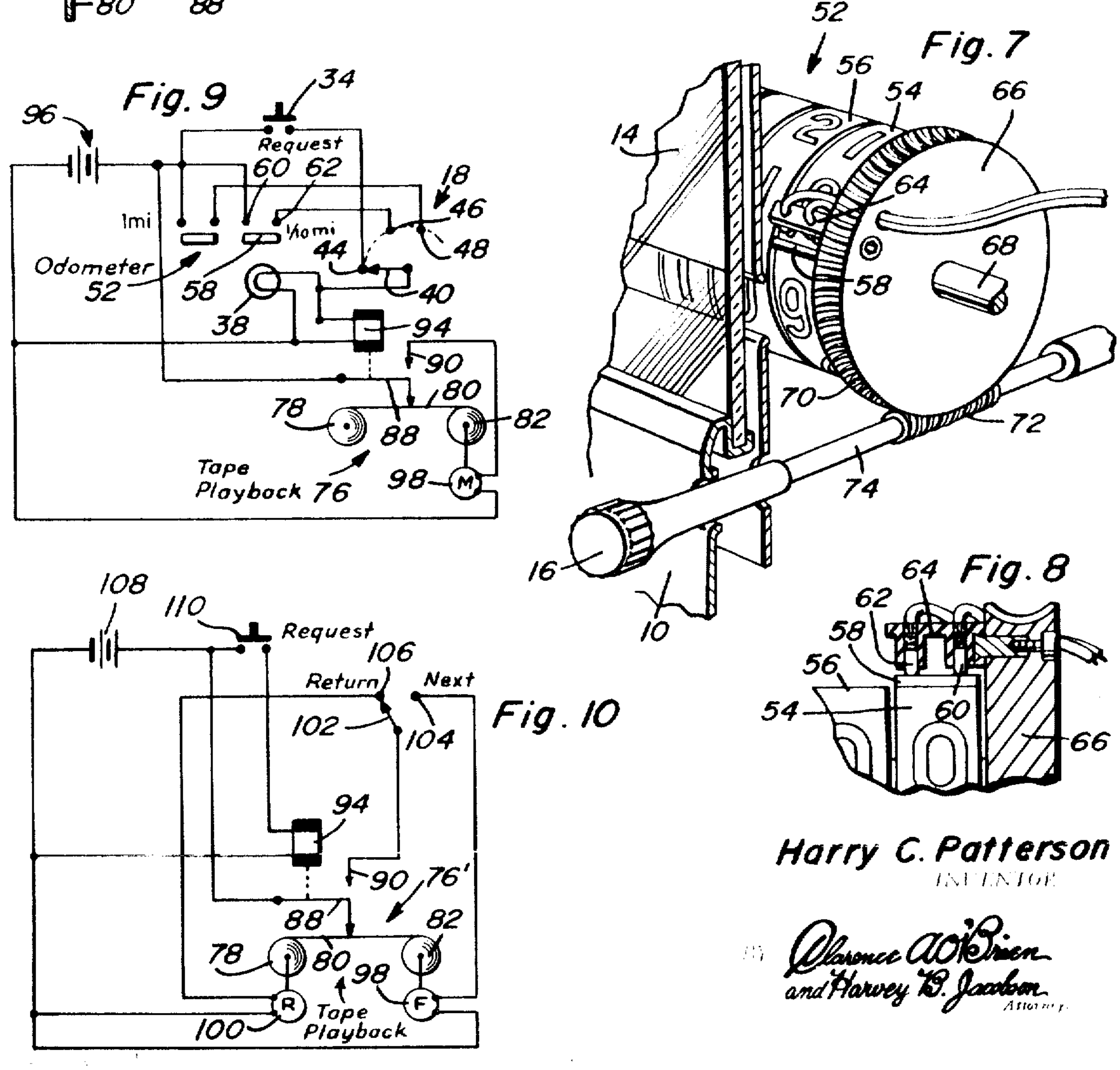
FIG. 7 is a perspective view of an odometer signal-producing component associated with the system of the present invention.
FIG. 8 is a partial sectional view through a portion of the component shown in FIG. 7.
FIG. 9 is an electrical circuit diagram corresponding to the system illustrated in FIGS. 1—8.
FIG. 10 is an electrical circuit diagram corresponding to another form of travel-directing system in accordance with the present invention.

Referring now to FIGS. 7 and 8, it will be observed that the odometer generally referred to by reference numeral 52 includes the usual mileage-indicating wheels such as the wheel 54 displaying tenths of a mile travelled and wheel 56 displaying each mile travelled by the vehicle. The wheels 54 and 56 are modified to mount on their peripheries, conductive strips 58 each adapted to bridge a pair of contacts such as the contacts 60 and 62 mounted on a bracket 64 associated with a signal-producing device adapted to be angularly positioned relative to the mileage-indicating wheels by means of an adjusting wheel 66 rotatably mounted on the supporting shaft 68 for the odometer wheels. Conductors connected to the contacts 60 and 62 accordingly extend from the mounting bracket 64 through the adjusting wheel 66 to the control circuit of the travel-directing system as will be hereafter described. In order to angularly position the contact-mounting bracket 64, the adjusting wheel is peripherally formed with worm wheel teeth 70 in mesh with the worm gear 72 secured to a control rod 74 to which the setting knob 16 is connected. Accordingly, at the start of a trip to be directed by the system of the present invention, the adjusting wheel 66 may be angularly positioned by means of the knob 16 until the contacts 60 and 62 are bridged by the element 58, the pilot lamp 38 on the control board 20 will be illuminated to indicate that the system is in operative condition.

Figures 5, 6:
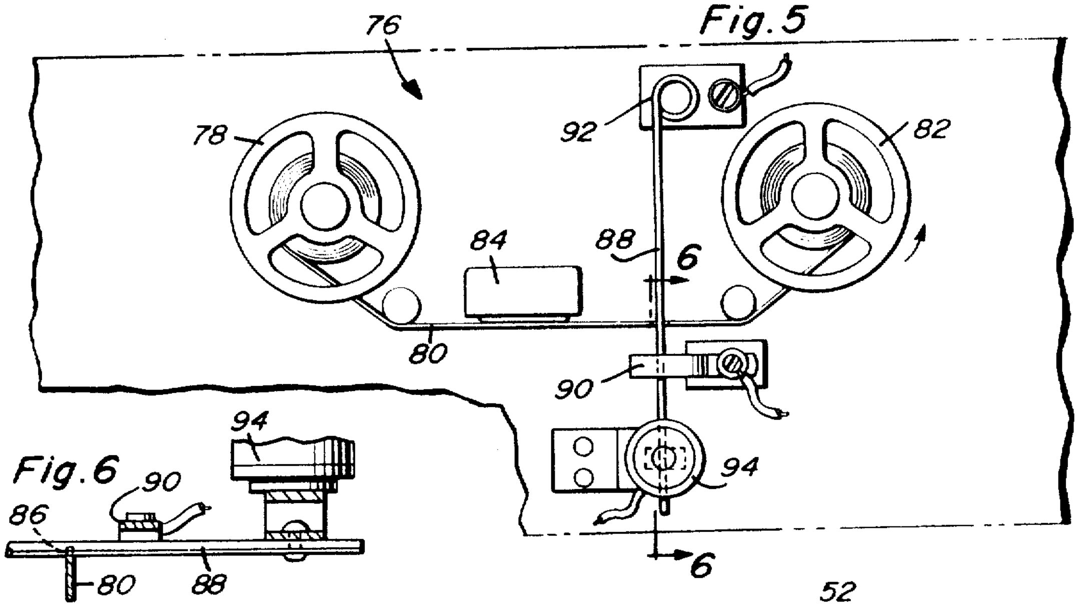
FIG. 5 is a simplified top plan view of one form of audio-reproducing device modified for use in the system of the present invention.
FIG. 6 is a partial sectional view taken substantially through a plane indicated by section line 6–6 in FIG. 5.

Any suitable form of audio reproducing device will be associated with the travel-directing system including for example a tape mechanism 76 as diagrammatically shown in FIG. 5. The tape mechanism includes for example, a storage reel 78 from which the record medium in the form of magnetic tape 80 is withdrawn and wound upon the takeup reel 82 causing the tape to continuously move past a pickup head 84 from which audio signals are fed to an amplifier and speaker device (not shown) in order to broadcast travel information and instructions to the occupants of the vehicle within which the system is installed. An electric motor drive is accordingly associated with the mechanism 76 for continuous movement of the magnetic tape between the reels 78 and 82. In accordance with the present invention however, the mechanism 76 is modified so that movement of the tape will automatically stop after playback of discrete message portions are completed. Toward this end, on edge of the tape may be provided with stop signal means such as notches 86 into which an electrically conductive feeler switch rod 88 is adapted to move out of contact with a switch element 90. A spring anchor portion 92 may therefore be associated with the rod 88 tending to displace the rod out of contact with the switch element 90. Except when the rod is received within a notch formation 86 on the upper edge of the tape 80, it will be held in contact with the switch element 90 against the light bias of the spring anchor portion 92. The switch element 90 and rod 88 thus constitute a disabling switch held in a closed position during movement of the magnetic tape but opened at the end of a discrete message portion in order to stop movement of the tape. In order to resume movement, the rod 88 may be upwardly displaced from a notch 86 into contact with the element 90 by means of a motor-controlling relay solenoid 94 fixedly mounted in operative relation to the rod 88 having its armature connected thereto for upward withdrawal of the rod when the solenoid is energized as more clearly seen in FIG. 6.

FIG. 9 shows a circuit for carrying out the operation hereinbefore described. It will be observed that a source of electrical energy such as the vehicle battery 96 is associated with the system for energization of the motor-controlling solenoid 94 and the tape transport drive motor 98 drivingly connected for example to the takeup reel 82 of the tape playback mechanism 76. One terminal of the battery is electrically connected to one of the contacts associated with the request switch 34 and one of the contacts associated with each of the pair of contacts respectively bridged by the conductive elements 58 on the odometer mileage-indicating wheels. The other contacts of the request switch and the distance-indicating signal contacts are respectively connected to the contact strips 44, 46 and 48 associated with the control assembly 18. Accordingly, momentary closing of the request switch 34 by the vehicle operator will produce a signal pulse transmitted to the contact 44 while signal pulses produced each tenth of a mile and each mile will be respectively transmitted to the contacts 46 and 48. Three sources of signal pulses are accordingly provided at the control assembly 18 for pulsing the solenoid 94 connected to one of the signal pulse sources by means of the selector switch arm 40. The switch arm is therefore connected to one terminal of the solenoid 94, the other terminal of which is connected to the negative terminal of the battery 96 as shown in FIG. 9. Also connected across the terminals of the solenoid 94 is the pilot lamp 38. It will be apparent that when the selector switch arm 40 engages the contact 46 for example, the pilot lamp 38 will be illuminated when the system is placed in an operative condition by means of the adjusting knob 16. Whenever a signal pulse is applied through switch arm 40 to the solenoid 94 it withdraws switch rod 88 from a notch 86 in the tape so that the pilot lamp 38 and the solenoid 94 are energized to complete a circuit through the switch rod 88 and switch element 90 to the drive motor 98 connected in parallel with the solenoid 94 to the battery 96. Movement of the tape 80 then ensues, the tape holding the rod 88 in contact with the switch element 90 so as to maintain the motor 98 energized after the solenoid 94 is deenergized as the odometer moves the conductive element 58 out of engagement with the contacts 60 and 62 so as to open the energizing circuit for the solenoid and the pilot lamp 38. The motor 98 accordingly continues to advance the tape 80 until a message portion is completed. At that point the rod 88 becomes aligned with a notch in the upper edge of the tape so as to open the motor circuit by moving out of contact with the switch element 90.

It will be appreciated that the duration of the message portion recorded on the tape 80 should be shorter than the intervals between which the contacts associated with the odometer wheels 54 and 56 are closed so that the tape transport mechanism 76 will stop before operation thereof is resumed in response to the net signal pulse. Accordingly, the preceding message portion will instruct the operator as to the position to which the selector switch arm 40 should be moved for the next message portion. For long message portions, the selector switch arm 40 should be engaged with either the contact 48 from which distance-indicating signals are derived at longer distance intervals or contact 44 from which signal pulses are derived on demand by momentary closing of the request switch 34. Thus, a relatively simple yet adequate control circuit is provided.

Another form of travel-directing system also employing a tape transport mechanism 76' as diagrammatically shown in FIG. 10 may be provided in accordance with the present invention which is modified in a manner similar to that hereinbefore described in connection with the mechanism 76 except that in addition to the drive motor 98 drivingly connected to the takeup reel 82 for advancing the tape 80, a reversing motor 100 is provided drivingly connected to the supply reel 78. The tape transport mechanism 76' is also provided with the motor-controlling solenoid 94 as hereinbefore described in connection with the mechanism 76 so as to effect a resumption of movement of the tape when a signal pulse is applied to the solenoid. The switch element 90 is however connected to the tape advancing motor 98 or the reversing motor 100 through a selector switch 102 adapted to alternatively engage the forward contact 104 or the reverse contact 106. Both motors 98 and 100 are accordingly connected in parallel to one terminal of the vehicle battery 108 the other terminal of which is connected to the switch rod 88 for completing a motor-energizing circuit when the rod 88 engages the switch element 90. Displacement of the switch rod 88 to initiate movement of the tape 80 after it has stopped, is effected by pulsing of the solenoid 94. Toward this end, signal pulses are applied to the solenoid 94 upon momentary closing of the request switch 110 similar in operation to the request switch 34 as hereinbefore described. The travel-directing system as illustrated in FIG. 10 will therefore broadcast travel information and instructions from discrete message portions of the tape 80, movement of which is automatically stopped at the end of each message portion as hereinbefore described in connection with FIG. 9. Movement of the tape is however resumed only on demand by closing of the request switch 110. The unique feature of the system of FIG. 10 is the provision of the selector switch 102 by means of which movement of the tape may be reversed in order to replay any message portion that the driver may desire.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What I claim as new is as follows:

1. A travel-directing system for a moving vehicle having mileage indicating odometer wheels comprising a recorded message-reproducing device having a record medium and a motor energized for continuous advancement of the record medium, motor control means responsive to signal pulses applied thereto for intermittently energizing said motor, said record medium having position responsive signal means cooperating with the motor control means for deenergizing the motor and stopping movement of the record medium upon completion of discrete message portions recorded on the record medium, said motor control means including a feeler switch connecting the motor to a source of current, said position-responsive signal means including means responsive to movement of the record medium for holding the switch closed and relay means responsive to said signal pulses for closing the switch when opened, said record medium being engaged with the feeler switch to hold the same closed, said signal means further comprising a formation in the record medium into which the switch drops to open the same thereby to deenergize the motor and stop movement of the record medium.

2. The combination of claim 1 wherein said demand signal means comprises a pushbutton request switch interconnected between said source of current and the motor control means.

3. The combination of claim 1 including distance-signalling means mounted in operative relation to the odometer wheels for producing said signal pulses at intervals of distance travelled by the vehicle, and signal-selecting means operatively connected to the demand signal means and the distance-signalling means for transmitting the signal pulses to the motor control means on demand of the operator or at selected intervals of distance travelled.

4. The combination of claim 3 wherein said demand signal means comprises a pushbutton request switch interconnected between said source of current and the motor control means.

5. The combination of claim 4 wherein said distance-signalling means includes, switching elements mounted on said odometer wheels and contacts operatively mounted adjacent said odometer wheels to be intermittently bridged by the switching elements.

6. A travel-directing system for a moving vehicle having mileage-indicating odometer wheels comprising recorded message-reproducing device having a record medium and a motor energized for continuous advancement of the record medium, motor control means responsive to signal pulses applied thereto for intermittently energizing said motor, said record medium having position-responsive signal means cooperating with the motor control means for deenergizing the motor and stopping movement of the record medium upon completion of discrete message portions recorded on the record medium, demand signal means operatively connected to the motor control means for selectively producing said signal pulses to energize the motor and release the record medium, distance-signalling means mounted in operative relation to the odometer wheels for producing said signal pulses at intervals of distance travelled by the vehicle, and signal-selecting means operatively connected to the demand signal means and the distance-signalling means for transmitting the signal pulses to the motor control means on demand of the operator or at selected intervals of distance travelled, said motor control means including a feeler switch connecting the motor to a source of current, means responsive to movement of the record medium for holding the switch closed, and relay means responsive to said signal pulses for closing the switch when opened by the signal means on a record medium, said demand signal means comprising a pushbutton request switch interconnected between said source of current and the motor control means and said distance-signalling means including switching elements mounted on said odometer wheels, contacts operatively mounted adjacent said odometer wheels to be intermittently bridged by the switching elements, an adjusting wheel mounting a pair of said contacts, and a control rod drivingly connected to the adjusting wheel for angularly positioning the contacts relative to the odometer wheels.